(12) United States Patent
Hayashi et al.

(10) Patent No.: US 7,768,655 B2
(45) Date of Patent: Aug. 3, 2010

(54) METHODS AND SYSTEM FOR MEASURING AN OBJECT

(75) Inventors: Steven Robert Hayashi, Niskayuna, NY (US); Zhongguo Li, Shanghai (CN); Kevin George Harding, Niskayuna, NY (US); Jianming Zheng, Shanghai (CN); Howard Paul Weaver, Mason, OH (US); Xiaoming Du, Shanghai (CN); Tian Chen, Shanghai (CN)

(73) Assignee: General Electric Company, Schenectady, NY (US)

( * ) Notice: Subject to any disclaimer, the term of this patent is extended or adjusted under 35 U.S.C. 154(b) by 170 days.

(21) Appl. No.: 11/642,076

(22) Filed: Dec. 20, 2006

(65) Prior Publication Data

US 2008/0148590 A1    Jun. 26, 2008

(51) Int. Cl.
*G01B 11/24* (2006.01)
(52) U.S. Cl. ...................................... 356/601; 356/608
(58) Field of Classification Search ......... 356/429–431, 356/601–624; 250/559.22, 559.24, 559.4, 250/559.44; 359/201, 226
See application file for complete search history.

(56) References Cited

U.S. PATENT DOCUMENTS

| | | | |
|---|---|---|---|
| 3,692,414 A | 9/1972 | Rosterman et al. | |
| 3,710,128 A | 1/1973 | Kubisiak | |
| 4,736,247 A | 4/1988 | Graham et al. | |
| 4,745,290 A | 5/1988 | Frankel et al. | |
| 5,477,371 A | 12/1995 | Shafir | |
| 5,568,260 A | 10/1996 | Schneiter | |
| 5,708,279 A | 1/1998 | Chong | |
| 5,846,081 A | 12/1998 | Bushway | |
| 6,788,807 B1 | 9/2004 | Norita et al. | |
| 6,862,099 B2 * | 3/2005 | Lam et al. | 356/635 |
| 6,927,863 B2 | 8/2005 | Gurny | |
| 2002/0154396 A1 * | 10/2002 | Overbeck | 359/368 |
| 2004/0263863 A1 | 12/2004 | Rogers et al. | |

OTHER PUBLICATIONS

An International Search Report dated Mar. 25, 2008 for International Application No. PCT/US2007/085994 (4 pages).

* cited by examiner

*Primary Examiner*—Gregory J Toatley, Jr.
*Assistant Examiner*—Tri T Ton
(74) *Attorney, Agent, or Firm*—William Scott Andes, Esq.; Armstrong Teasdale LLP

(57) ABSTRACT

A method of measuring an object includes positioning the object on a moveable stage, performing a rotary scan of the object with a range sensor, and determining geometric parameters of the object based on the rotary scan.

17 Claims, 5 Drawing Sheets

METHODS AND SYSTEM FOR MEASURING AN OBJECT

BACKGROUND OF THE INVENTION

This invention relates generally to measurement systems and, more particularly, to methods and systems for measuring cutting tools.

Cutting tools are an essential component used in manufacturing aircraft parts, such as engine blades. At least some known cutting tools are manufactured with complex geometric shapes and sharp and/or curved edges. As such, maintaining quality control of cutting tools during their fabrication may be essential to controlling a quality of components manufactured using the cutting tools. Specifically, if a plurality of tools is used to manufacture a plurality of identical engine blades, it is essential each of the cutting tools be fabricated with accurately controlled contours and dimensions. However, because of known manufacturing techniques, often it is common for known cutting tools to be manufactured with dimensions and contours that are not always adequately inspected or controlled. Accordingly, at least some known engine blades may be manufactured with different dimensions and contours.

For example, FIG. 1 illustrates a design model for use in manufacturing a cutting tool and two exemplary cutting tools manufactured based on the design model. More specifically, FIG. 1(a) illustrates a cutting tool manufactured with a first grinding machine, FIG. 1(b) illustrates a cutting tool manufactured with a second grinding machine and FIG. 1(c) illustrates the design model for the cutting tool. As seen in FIG. 1, cutting tools are often fabricated with contours and dimensions that differ from the design model. More specifically, a cutting tool manufactured with a first grinding machine may include contours and dimensions that differ from a cutting tool manufactured with a second grinding machine.

Accordingly, it is common to inspect cutting tools to ensure uniformity. More specifically, often parameters of each cutting tool are measured and verified against a standard to ensure conformity with the design model. However, known measuring systems only measure the cutting tool using two dimensions, in that known measuring systems are limited to measuring only a few parameters of the cutting tool and one characteristic at a time. As such the measurements may be unreliable and time consuming. In addition, because known measuring systems generally require several manual operations, reproducibility of the measurements may be limited.

BRIEF DESCRIPTION OF THE INVENTION

In one aspect, a method of measuring an object includes positioning the object on a moveable stage, performing a rotary scan of the object with a range sensor, and determining geometric parameters of the object based on the rotary scan.

In a further aspect, a system for measuring an object includes a range sensor for performing a rotary scan of the object to determine geometrical parameters of the object, and a movable stage for retaining the object. In a further aspect, a method for scanning an object with known helical configuration may be scanned with a helical scan motion of the object.

In another aspect, a range sensor for performing a rotary scan of an object to determine geometrical parameters of the object is provided. The range sensor includes an optical sensor and a periscope coupled to the optical sensor. At least one of the optical sensor and the periscope is configured to rotate. The range sensor is configured to move relative to the object.

DETAILED DESCRIPTION OF THE INVENTION

The present invention provides exemplary methods and a system for use in measuring an object. Specifically, in the exemplary embodiment, the system includes a range sensor for performing a rotary scan of the object, and a movable stage for retaining the object. Further, the range sensor includes an optical sensor and a periscope coupled to the optical sensor. At least one of the optical sensor and the periscope is configured to rotate. Moreover, the range sensor is configured to move relative to the object. Accordingly, the system provides a method of helically scanning the object to facilitate gathering point cloud data and automatically measuring each parameter of an object in such a manner that reproducibility of the measurements is facilitated.

Although the present invention is described below in reference to its application in connection with measuring cutting tools, it should be apparent to those skilled in the art and guided by the teachings herein provided that with appropriate modification, the system and methods of the present invention can also be suitable for measuring any object, including, but not limited to, aircraft engine components.

Figure 1:
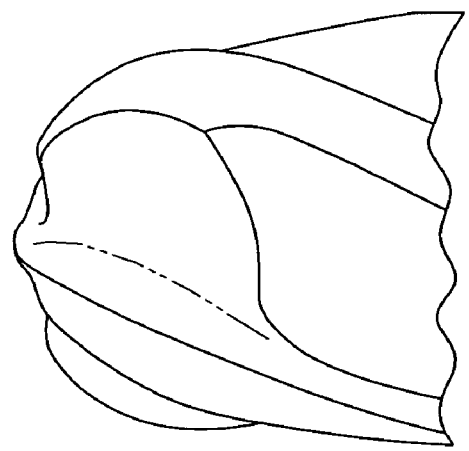
FIG. 1 is an exemplary cutting tool design model and two cutting tools manufactured based on the design model.
Figure 1:
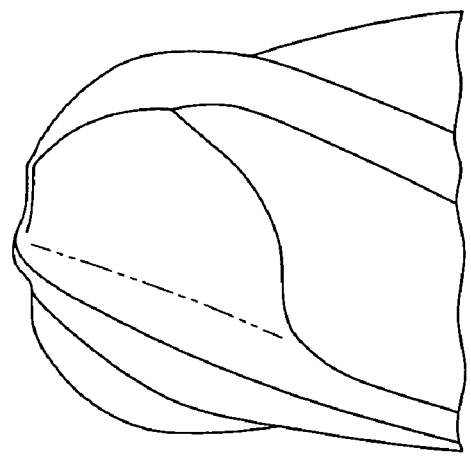
Figure 1:
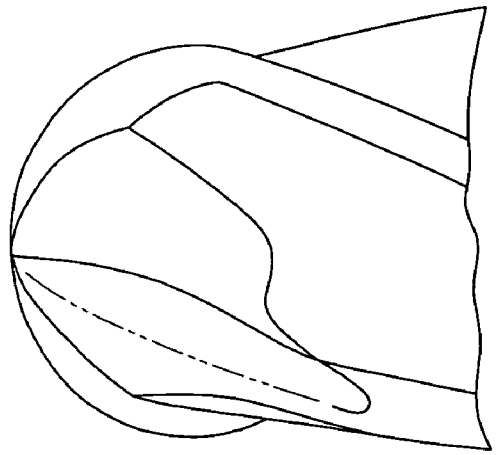
Figure 2:
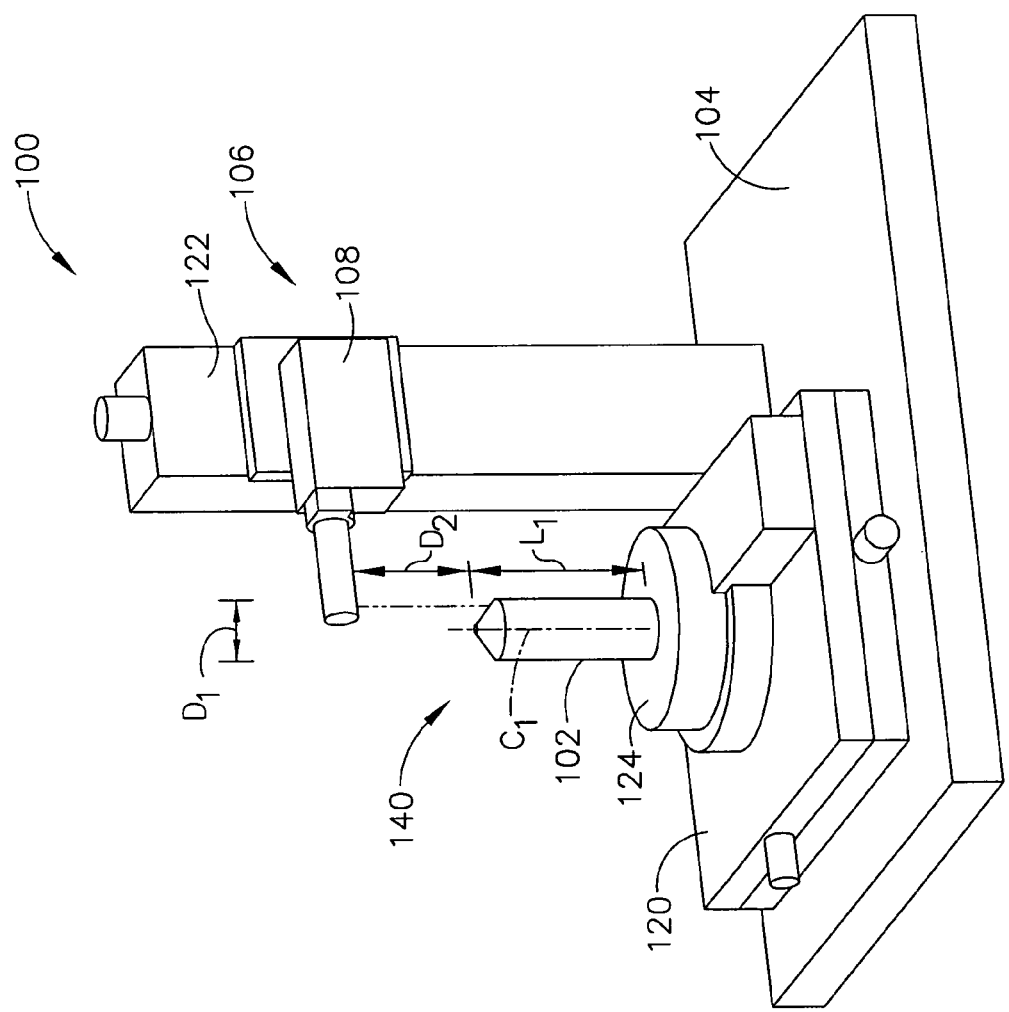
FIG. 2 is a view of an exemplary measurement system that may be used to measure a cutting tool.
Figure 3:
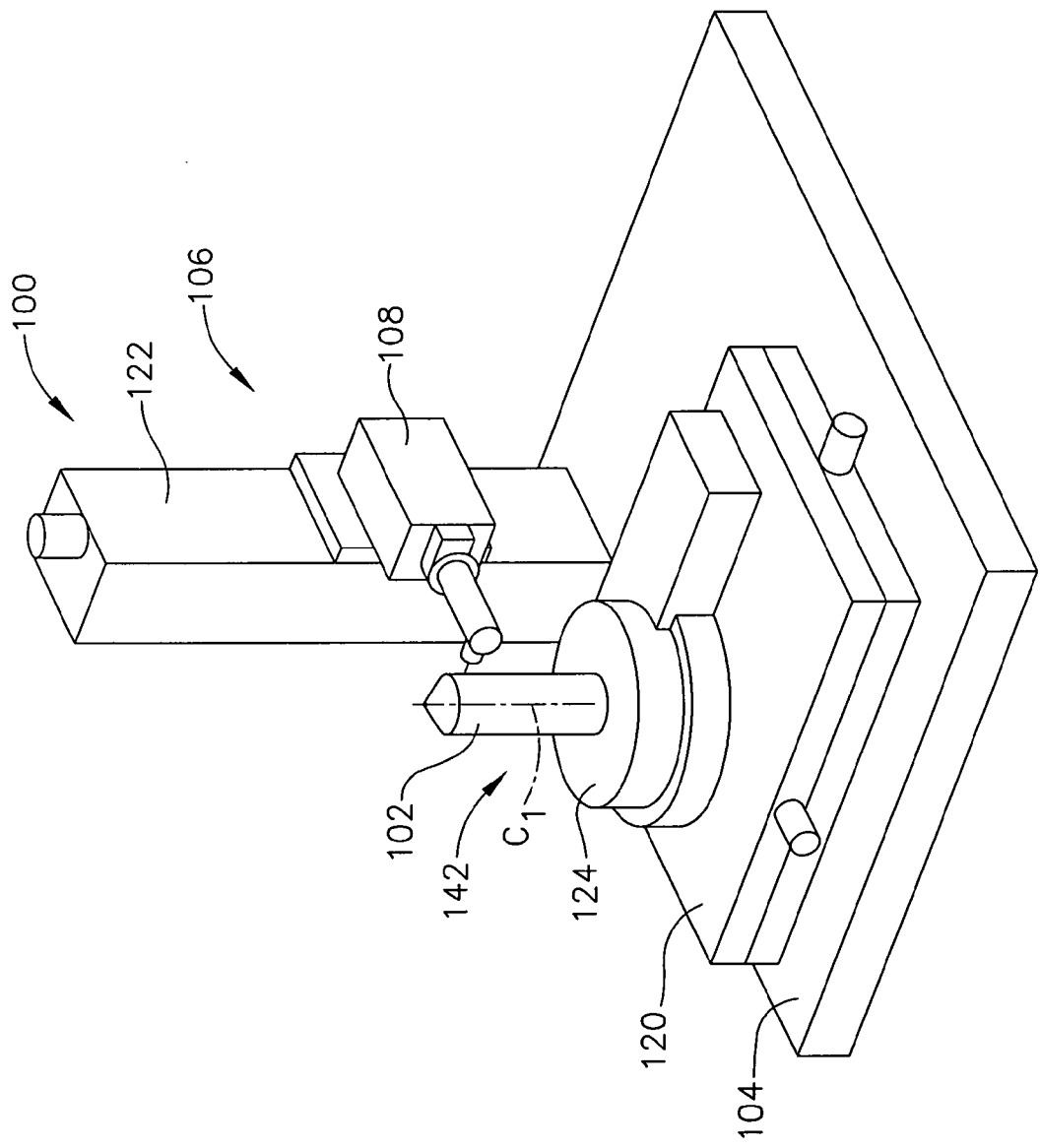
FIG. 3 is an alternative view of the measurement system shown in FIG. 2.
Figure 4:
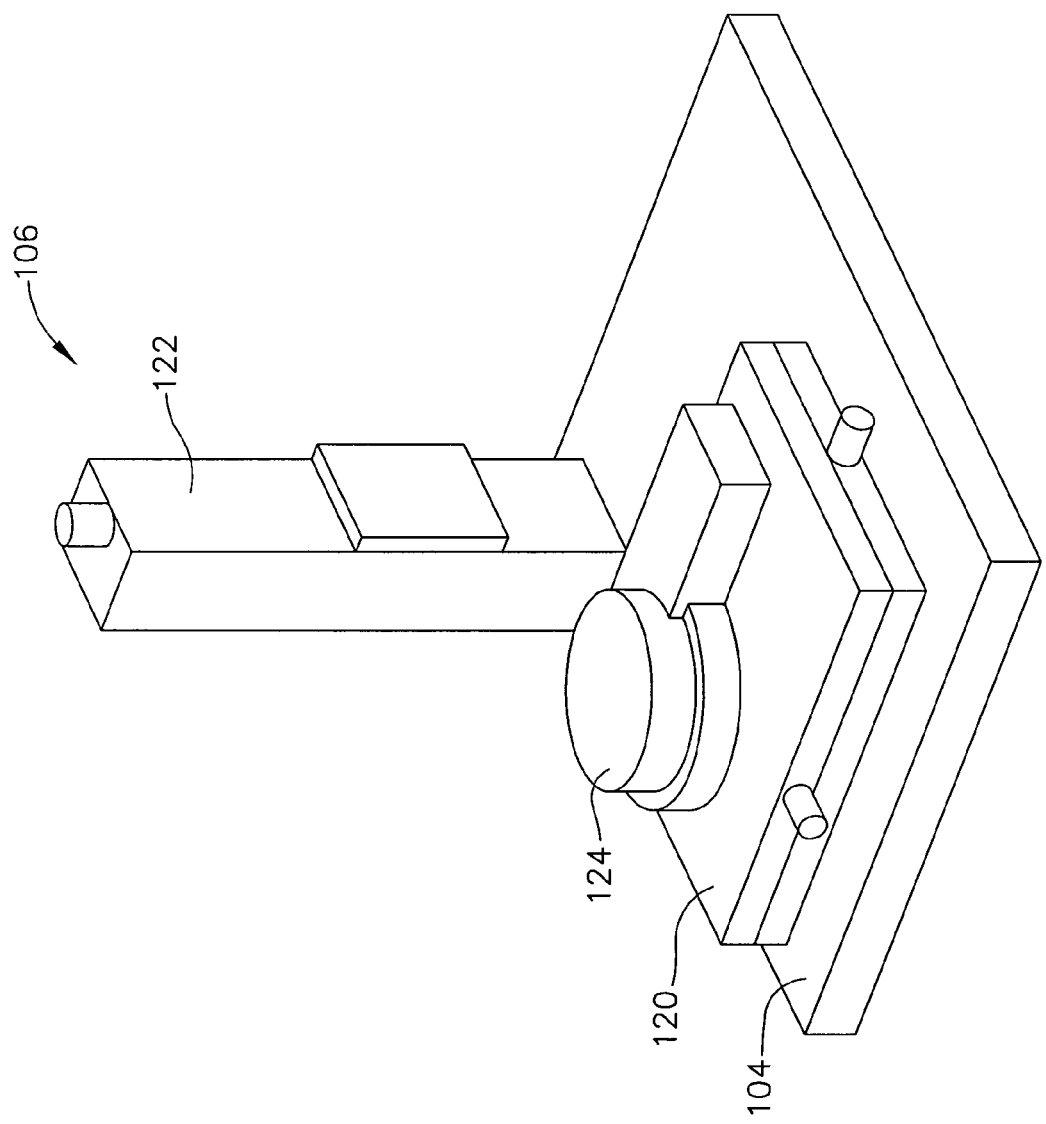
FIG. 4 is a view of an exemplary stage that may be used with the measurement system shown in FIGS. 2 and 3.
Figure 5:
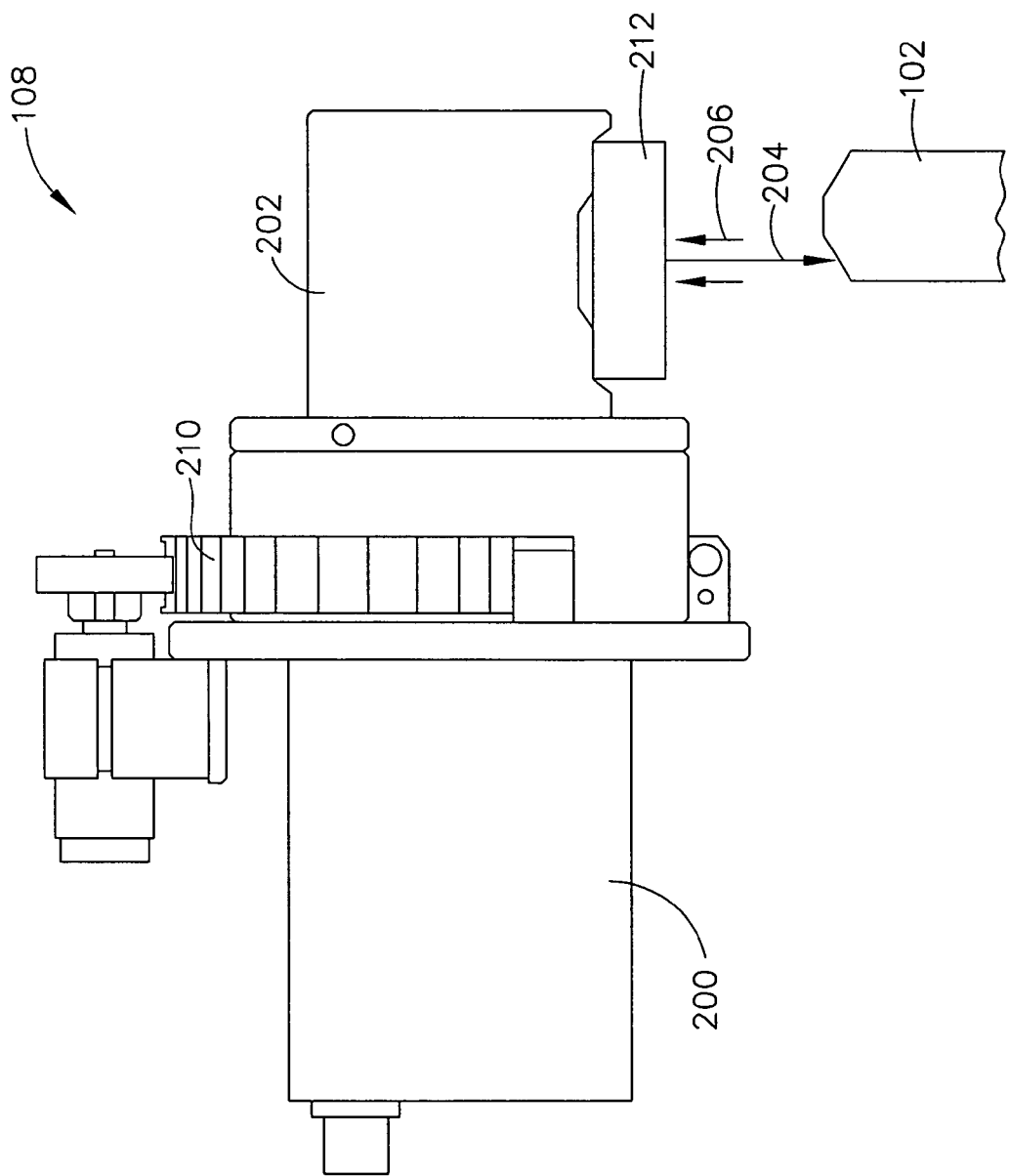
FIG. 5 is a view of an exemplary range sensor that may be used with the measurement system shown in FIGS. 2 and 3.

FIG. 2 is a view of an exemplary system 100 that may be used to measure a cutting tool 102. Specifically, FIG. 2 is a view of system 100 oriented to measure an end 140 of a cutting tool 102. FIG. 3 is an alternative view of system 100. Specifically, FIG. 3 illustrates system 100 oriented to scan a side 142 of cutting tool 102. In the exemplary embodiment, system 100 includes a base 104, a stage 106, and a range sensor 108. FIG. 4 is a view of stage 106, and FIG. 5 is a perspective view of range sensor 108.

Although not illustrated, as should be appreciated by one skilled in the art, in the exemplary embodiment, system 100 is electronically coupled to at least one of a computer, a database, and/or a processor to store and analyze data. Moreover, in the exemplary embodiment, system 100 is electronically coupled to at least one monitor (not shown) to display data.

In the exemplary embodiment, stage 106 is moveable relative to base 104, and in the exemplary embodiment, includes a first stage 120 and a second stage 122. First stage 120 is oriented to retain cutting tool 102 thereon. More specifically, in the exemplary embodiment, first stage 120 includes a rotary axis 124 that is oriented to retain cutting tool 102 thereon. More specifically, in the exemplary embodiment, system 100 is sized and shaped to retain and measure any cutting tool 102 thereon that has a length $L_1$ within a range of approximately zero millimeters to approximately 200 millimeters. Moreover, in the exemplary embodiment, system 100 is sized and shaped to retain and measure any cutting tool 102 thereon that has a diameter $D_1$ within a range of approximately zero millimeters to approximately 25.4 millimeters. In an alternative embodiment, with modification, system 100 may be sized and shaped to retain and measure any cutting tool having any length $L_1$ and/or diameter $D_1$ that is capable of being retained and measured by system 100. Moreover, cutting tool 102 is retained using any suitable coupling mechanism and/or retention mechanism that enables system 100 to operate as described herein.

Further, in the exemplary embodiment, first stage 120 is an X-Y stage. Specifically, first stage 120 is configured to translate along an X-axis and a Y-axis. More specifically, in the exemplary embodiment, first stage 120 is configured to translate along the X-axis within a range of approximately zero millimeters to approximately 50 millimeters with a resolution of approximately 0.1 micrometers. Further, in the exemplary embodiment, first stage 120 is configured to translate along the Y-axis within a range of approximately zero millimeters to approximately one hundred millimeters with a resolution of approximately 0.1 micrometers. In an alternative embodiment, first stage 120 is configured to translate along the X-axis and/or the Y-axis within any suitable range having any suitable resolution that enables system 100 to operate, as described herein. Moreover, in the exemplary embodiment, rotary axis 124 is configured to rotate cutting tool 102 about a Z-axis. More specifically, rotary axis 124 rotates cutting tool 102 about a cutting tool centerline $C_1$. In the exemplary embodiment, rotary axis 124 is configured to rotate approximately 360° with a resolution of approximately 0.0001 degrees. In an alternative embodiment, rotary axis 124 is configured to rotate within any suitable range with any suitable resolution that enables system 100 to operate, as described herein.

In the exemplary embodiment, range sensor 108 is coupled to second stage 122. Further, in the exemplary embodiment, second stage 122 is an X-Y-Z-stage that is configured to translate range sensor 108 along at least one of an X-axis, a Y-axis, and a Z-axis. Further, in the exemplary embodiment, second stage 122 is configured to translate range sensor 108 along the Z-axis within a range of approximately zero millimeters to approximately 250 millimeters with a resolution of approximately 0.1 micrometers. In an alternative embodiment, stage 122 is configured to translate range sensor 108 along the Z-axis within any suitable range and with any suitable resolution that enables system 100 to operate, as described herein. In the exemplary embodiment, second stage 122 may be configured to translate range sensor 108 along the X and Y axis within a range that is substantially similar to the range of first stage 120 and with a resolution that is substantially similar to the resolution of first stage 120. In an alternative embodiment, second stage 122 is configured to translate range sensor 108 along the X and Y axis within any suitable range with any suitable resolution that enables system 100 to operate, as described herein. Accordingly, in the exemplary embodiment, range sensor 108 is positionable at variable distances from first stage 120. As such, range sensor 108 is positionable at variable distances $D_2$ from cutting tool 102.

Accordingly, first stage 120 is oriented to move and/or rotate cutting tool 102, and second stage 122 is oriented to position range sensor 108 at a desired distance $D_1$ from cutting tool 102. As such, first stage 120 and second stage 122 facilitate measuring any point of cutting tool 102, as described below.

In the exemplary embodiment, the X, Y, and Z translation of stage 106 has an absolute accuracy of approximately one micrometer to approximately two micrometers. Further, in the exemplary embodiment, the X, Y, and Z translation of stage 106 has a repeatability of approximately 0.5 micrometers to approximately 1 micrometer. In addition, in the exemplary embodiment, the X, Y, and Z translation of stage 106 has an orthogonality of approximately 0.0015 degrees. In an alternative embodiment, the X, Y, and Z translation of stage 106 has any suitable absolute accuracy, repeatability, and/or orthogonality that enables system 100 to operate, as described herein.

Referring to FIG. 5, in the exemplary embodiment, range sensor 108 includes an optical sensor 200 and a periscope 202 that is coupled to optical sensor 200. In the exemplary embodiment, range sensor 108 is configured to perform a rotary scan of cutting tool 102. In one embodiment, optical sensor 200 is a conoscopic sensor, for example, the Optimet Smart Probe described in U.S. Pat. No. 5,953,137. In another embodiment, optical sensor 200 is any ranging type sensor that is capable of operating as described herein.

In the exemplary embodiment, optical sensor 200 is configured to direct a beam of light 204 through periscope 202, such that light 204 is directed toward a portion of cutting tool 102. In the exemplary embodiment, light 204 reflects off of cutting tool 102, such that a beam of light 206 is directed towards optical sensor 200. Optical sensor 200 receives light 206, forms an interference pattern of said light and measures a wavelength thereof. In the exemplary embodiment, optical sensor 200 determines a distance between optical sensor 200 and cutting tool 102 based on a difference between a wavelength of the pattern of light 204 and a wavelength of the pattern of light 206. In one embodiment, optical sensor 200 determines the distance with an accuracy of approximately ±1.5 microns. In an alternative embodiment, optical sensor 200 determines the distance with any suitable accuracy that enables system 100 to operate, as described herein. Moreover, in the exemplary embodiment, optical sensor 200 uses a frequency of up to approximately 3000 kilohertz to acquire data. In an alternative embodiment, optical sensor 200 uses any suitable frequency to acquire data that enables system 100 to operate, as described herein. By determining a distance to a plurality of points of cutting tool 102, system 100 identifies various geometric parameters of cutting tool 102. Specifically, the distance determinations enable system 100 to generate a scanned point cloud that is used to generate an accurate cross section or three dimensional model of cutting tool 102.

In the exemplary embodiment, range sensor 108 includes a rotation mechanism 210 that is coupled to periscope 202. In the exemplary embodiment, rotation mechanism 210 rotates periscope 202 within a range of approximately 0° to approximately 90°. In an alternative embodiment, rotation mechanism 210 rotates periscope 202 within any suitable range that enables system 100 to operate, as described herein. Specifically, in the exemplary embodiment, rotation mechanism 210 is configured to rotate periscope 202, to enable a periscope lens 212 to align with an end 140 of cutting tool 102, as shown in FIG. 2, or to align with a side 142 of cutting tool 102, as shown in FIG. 3. Moreover, in the exemplary embodiment, rotation mechanism 210 is configured to rotate periscope 202, such that lens 212 is aligned with any point between end 140 of cutting tool 102 and side 142 of cutting tool 102. Rotation mechanism 210 may be any suitable rotation mechanism that enables system 100 to operate, as described herein. Moreover, in one embodiment, optical sensor 200 is also configured to rotate. As such, lens 212 is enabled to align with any portion of cutting tool 102 by rotating periscope 202 and/or rotating optical sensor 200.

During operation, in the exemplary embodiment, periscope 202 and/or optical sensor 200 is rotated to align lens 212 with a point of cutting tool 102 that is to be measured. Light 204 from optical sensor 200 is directed through periscope lens 212 towards cutting tool 102. Light 206 reflects off of cutting tool 102 and is directed through periscope lens 212 towards optical sensor 200.

Referring to FIGS. 2-5, during operation, cutting tool 102 is positioned on rotary axis 124 and is aligned with lens 212. Specifically, first stage 120 and second stage 122 are manipulated to position cutting tool 102 in relation to range sensor 108. Periscope 202 and/or optical sensor 200 are then rotated to align lens 212 with an individual point of cutting tool 102 Light 204 from optical sensor 200 is directed through periscope lens 212 towards the individual point of cutting tool 102 to facilitate producing reflected light 206. Light 206 is directed through periscope lens 212 towards optical sensor 200, such that a distance between optical sensor 200 and cutting tool 102 may be determined. In the exemplary embodiment, the determined distance is stored in a computer (not shown) or some other similar device.

At least one axis of first stage 120, second stage 122, third stage 124, optical sensor 200, and periscope 202 is then manipulated to enable a second point of cutting tool 102 to be scanned. In the exemplary embodiment, the process of scanning individual points is repeated until a desired portion of cutting tool 102 has been measured. In one embodiment, system 100 is automated to measure a plurality of individual points without user intervention.

By integrating movable stage 106 and a rotatable range sensor 108, system 100 can perform pre-scanning to facilitate motion planning to drive system 100 to facilitate a more accurate scan, in comparison to known measurement systems. Simultaneously, each axis of stage 106 and range sensor 108 can be simultaneously triggered to achieve data synchronization. Accordingly, system 100 generates a point cloud from which geometric parameters of cutting tool 102 can be determined. As such, system 100 is enabled to perform three-dimensional modeling for downstream CAE analysis and cutting physics simulation.

Specifically, the data acquired while measuring cutting tool 102 enables a scanned point cloud to be generated from which parameters of cutting tool 102 can be extracted. As such, a reproducibility of the measurements is greater than that of known measuring systems. Moreover, in one embodiment, the scanned point cloud provides three-dimensional modeling capability and is utilized to perform CAD modeling for downstream CAE analysis and cutting physics simulation. Accordingly, system 100 utilizes the acquired data to perform at least one of correcting mechanical errors associated with measuring cutting tool 102, calculating parameters of cutting tool 102 and generating a three-dimensional model of cutting tool 102. In addition, the cutting parameters of cutting tool 102 may be automatically stored in a spreadsheet, interactively displayed in a graphical window, or printed in hardcopy form.

In one embodiment, a method of measuring an object includes positioning the object on a moveable stage, performing a rotary scan of the object with a range sensor, and determining geometric parameters of the object based on the rotary scan.

The present invention provides a method and system for measurement of an object that enables a greater reproducibility than known measurement systems. Specifically, the system enables a user to obtain at least one of a section scan and a scanned point cloud and determine multiple geometric parameters of an object. The initial rough scanning enables the system to perform motion planning to efficiently guide the motion of the system. Accordingly, the system provides a more accurate determination of a cutting tool's dimensions and contours, in comparison to known measurement systems. Moreover, the improved measurements enable the system to automatically display parameters of the cutting tool in a spreadsheet and/or graphical window and/or automatically produce a three dimensional model of the cutting tool.

The present invention provides a reproducibility that facilitates providing more uniform cutting tools for manufacturing engine blades. As such, the engine blades manufactured with such cutting tools are facilitated to be more uniform and/or accurately manufactured. Accordingly, the present invention facilitates improving engine blade manufacturing, such that an efficiency and/or useful life of the engine blades and/or an engine including the engine blade is facilitated to be increased.

As used herein, an element or step recited in the singular and proceeded with the word "a" or "an" should be understood as not excluding plural said elements or steps, unless such exclusion is explicitly recited. Furthermore, references to "one embodiment" of the present invention are not intended to be interpreted as excluding the existence of additional embodiments that also incorporate the recited features.

While the invention has been described in terms of various specific embodiments, those skilled in the art will recognize that the invention can be practiced with modification within the spirit and scope of the claims.

What is claimed is:

1. A method of measuring an object, said method comprising:
providing a stage assembly including a first stage and a second stage, wherein the first stage is translatable in a first direction and a second direction, the second stage translatable in the first direction, the second direction, and a third direction;
positioning the object on the first stage, wherein the first stage is configured to rotate the object;
performing a rotary scan of the object using a range sensor coupled to the second stage, wherein at least one of the first stage and the second stage is translatable simultaneously with rotation of the range sensor;
generating a point cloud based on the rotary scan; and
determining geometric parameters of the object in three-dimensions based on the rotary scan using the point cloud.

2. A method in accordance with claim 1 further comprising moving the range sensor relative to the object in at least one of the first direction, the second direction, and the third direction.

3. A method in accordance with claim 1 further comprising at least one of rotating the object relative to the range sensor and moving the object.

4. A method in accordance with claim 1 further comprising pre-scanning the object to facilitate motion planning of the scan.

5. A method in accordance with claim 1 further comprising at least one of correcting mechanical errors associated with measuring the object, calculating parameters of the object, and generating a three-dimensional model of the object.

6. A method in accordance with claim 1 wherein the range sensor includes an optical sensor and a periscope, said method further comprising at least one of rotating the periscope and rotating the optical sensor.

7. A method in accordance with claim 1 further comprising automating a system to measure the object.

8. A system for measuring an object, said system comprising:
a range sensor for performing a rotary scan of the object to facilitate determining geometric parameters of the object in three-dimensions using a point cloud; and
a stage assembly comprising a first stage and a second stage, wherein said first stage is translatable in a first direction and a second direction, said second stage translatable in the first direction, the second direction, and a third direction, wherein said first stage is configured to rotate the object and wherein said range sensor is coupled to said second stage, at least one of said first stage and said second stage translatable simultaneously with rotation of said range sensor.

9. A system in accordance with claim 8 wherein said range sensor is configured to be moved relative to the object in at least one of the first direction, the second direction, and the third direction.

10. A system in accordance with claim 8 wherein said first stage is configured to move the object relative to the range sensor.

11. A system in accordance with claim 8 wherein said range sensor is configured to pre-scan the object to facilitate motion planning of the scan.

12. A system in accordance with claim 8 wherein said range sensor is configured to at least one of correct mechanical errors associated with measuring the object, calculate parameters of the object, and generate a three-dimensional model of the object.

13. A system in accordance with claim 8 wherein said range sensor comprises an optical sensor and a periscope coupled to said optical sensor, wherein at least one of said optical sensor and said periscope is configured to rotate.

14. A system in accordance with claim 8 wherein said system is automated.

15. A range sensor comprising:

an optical sensor; and a rotatable periscope coupled to said optical sensor, said range sensor configured to be translated in a first direction, a second direction, and a third direction to perform a rotary scan of the object to facilitate determining geometric parameters of the object in three-dimensions using a point cloud, said range sensor configured to be simultaneously translated and rotated.

16. A range sensor in accordance with claim 15 wherein said range sensor is configured to pre-scan the object to facilitate motion planning of the scan.

17. A range sensor in accordance with claim 15 wherein said range sensor is configured to at least one of correct mechanical errors associated with measuring the object, calculate parameters of the object, and generate a three-dimensional model of the object.

* * * * *